(12) United States Patent
Mattina

(10) Patent No.: US 10,339,059 B1
(45) Date of Patent: Jul. 2, 2019

(54) GLOBAL SOCKET TO SOCKET CACHE COHERENCE ARCHITECTURE

(71) Applicant: Matthew Mattina, Boylston, MA (US)

(72) Inventor: Matthew Mattina, Boylston, MA (US)

(73) Assignee: Mellanoz Technologeis, Ltd., Yokneam (IL)

( * ) Notice: Subject to any disclaimer, the term of this patent is extended or adjusted under 35 U.S.C. 154(b) by 143 days.

(21) Appl. No.: 14/246,213

(22) Filed: Apr. 7, 2014

Related U.S. Application Data

(60) Provisional application No. 61/809,514, filed on Apr. 8, 2013.

(51) Int. Cl.
*G06F 12/0817* (2016.01)
*G06F 12/0831* (2016.01)

(52) U.S. Cl.
CPC ...... *G06F 12/0817* (2013.01); *G06F 12/0822* (2013.01); *G06F 12/0831* (2013.01); *G06F 2212/622* (2013.01)

(58) Field of Classification Search
None
See application file for complete search history.

(56) References Cited

U.S. PATENT DOCUMENTS

| | | | | |
|---|---|---|---|---|
| 2001/0010068 A1* | 7/2001 | Michael | ............... | G06F 12/0817 711/119 |
| 2003/0093722 A1* | 5/2003 | Shanahan | ............. | G06F 12/082 714/42 |
| 2007/0079072 A1* | 4/2007 | Collier | ................. | G06F 12/082 711/133 |
| 2007/0150664 A1* | 6/2007 | Dombrowski | ...... | G06F 12/0833 711/144 |
| 2007/0156972 A1* | 7/2007 | Uehara | ............... | G06F 12/0831 711/146 |
| 2008/0086601 A1* | 4/2008 | Gaither | ............... | G06F 12/0824 711/141 |
| 2010/0235586 A1* | 9/2010 | Gonion | ............... | G06F 12/0831 711/144 |
| 2012/0005439 A1* | 1/2012 | Ukai | ................... | G06F 12/0822 711/158 |

\* cited by examiner

*Primary Examiner* — Sean D Rossiter
*Assistant Examiner* — Charles J Choi
(74) *Attorney, Agent, or Firm* — Fish & Richardson, P.C.

(57) ABSTRACT

A flexible, scalable server is described. The server includes plural server nodes each server node including processor cores and switching circuitry configured to couple the processor to a network among the cores with the plurality of cores implementing networking functions within the compute nodes wherein the plurality of cores networking capabilities allow the cores to connect to each other, and to offer a single interface to a network coupled to the server.

22 Claims, 4 Drawing Sheets

GLOBAL SOCKET TO SOCKET CACHE COHERENCE ARCHITECTURE

BACKGROUND

This description relates to processors for computing in parallel processing environments and more particularly to multi-chip processors.

FPGAs (Field Programmable Gate Arrays) and ASICs (Application Specific Integrated Circuits) are two exemplary approaches for implementing customized logic circuits. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs typically consume more power for performing comparable functions as an ASIC and their performance can be 10 to 20 times worse than that of an ASIC.

Typically computer systems employ processors. One type of processor is a multicore processor. A multicore processor typically includes plural processor cores on a common chip. Multicore processor systems (e.g., tiled processors) use parallel processing to achieve some features of both ASICs and FPGAs. For example, some multicore systems are power efficient like an ASIC because they use custom logic for some functions, and reconfigurable like FPGAs because they are programmable in software.

SUMMARY

Multicore chips commonly maintain cache coherence inside the multicore chip. That is, if any tile or processor within the chip accesses a memory location, that tile or processor receives an up to date copy of the data. It is desirable to connect multiple multicore chips together, where each multicore chip might be connected to a mother board using its own socket, while having all of the tiles within the multiple sockets collaborate on some task to achieve the effect of a single large multicore chip. One problem is that the tiles in separate chips might see different versions of memory, etc., leading to cache coherence problems.

According to an aspect of the invention, a method of maintaining cache coherency in a system having a plural multi-core processor cores chips in plural sockets includes receiving a read request at a memory controller, accessing an ownership directory to determine if the read request hits or misses in the ownership directory; for a miss, returning the block with a shared status without snooping, when the read hits in the ownership directory, producing a specific socket ID corresponding to the multi-core processor cores chip socket that has the exclusive copy of the requested line and sending a directed message to the specified socket to supply the requested line.

These features are part of a mechanism for maintaining cache coherence across multiple chips and/or sockets providing a protocol for finding the up-to-date copy of a cache block (or cache line, or cacheline) when a tile or processor accesses a given cache block. Within a chip, a typical cache access that misses in a level 1 cache and a level 2 cache on the tile, will ultimately access a Level 3 cache on a chip. This level 3 cache can be a distributed level 3 cache. The protocol is activated when the access misses in the level 3 cache. There are multiple ways in which cache coherence can be maintained across multiple chips, and this is one example protocol. The protocol described is an invalidate-based protocol, but other protocols such as update protocols can also be used.

The details of one or more embodiments of the invention are set forth in the accompanying drawings and the description below. Other features, objects, and advantages of the invention will be apparent from the description and drawings, and from the claims.

DETAILED DESCRIPTION

1. Exemplary System Overview

The system described in this section (with reference to FIGS. 1A and 1B) provides an overview of various aspects of a parallel processing environment that can be used for a variety of the techniques described in other sections.

A multicore processor can be manufactured as a chip containing multiple processing engines or cores. Using multiple cores to process applications can provide greater computing throughput and also lower power. There are many challenges to building a multicore processor. These include the challenges of how to connect the cores to each other efficiently, how to manage data sharing between the cores, how to supply data from input-output devices to the cores in a coherent manner, and how to construct operating systems for multicore processors. Bus based multicore chips use a bus to connect the cores, but buses may be a throughput bottleneck and may also consume a lot of power. An alternative way to connect the cores is to use a point-to-point network such as a mesh network or a ring network. Networks such as a mesh have switches arranged in a grid pattern in which neighboring switches are connected to each other. When the cores include a switch component for a network such as a mesh, the cores can be laid out in a simple rectangular tiled pattern. Such multicore chips are called tiled multicore processors. Because the conductor paths are short in tiled multicore processors, signals can travel short distances when neighboring cores need to communicate. Tiled multicore processors generally consume lower power than bus based multicore processors.

U.S. patent application Ser. No. 12/885,957 entitled: "Managing Shared Resources In An Operating System" filed: Sep. 20, 2010; and U.S. patent application Ser. No. 13/280,927 entitled: "Computing In Parallel Processing Environments" filed: Oct. 25, 2011 are incorporated herein by reference in their entirety.

Figure 1A:
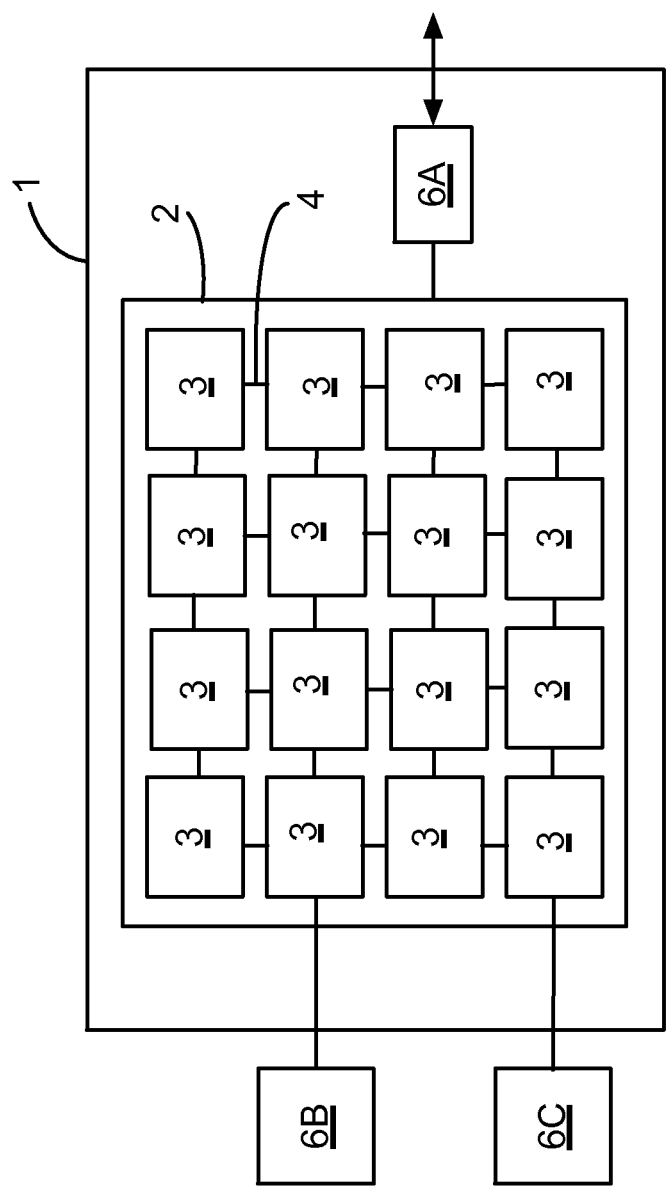
FIG. 1A is a block diagram of a tiled integrated circuit.

Referring to FIG. 1A, an integrated circuit 1 (or "chip") includes an array 2 of interconnected tiles 3. Each of the tiles 3 is a functional unit that includes a processor (or "processor core") and a switch that forwards data from other tiles to the processor and to switches of other tiles over data paths 4. The switch is coupled to the processor so that data can be sent to or received from processors of other tiles over the communication fabric formed by the switches and data paths. The integrated circuit 1 includes other on-chip circuitry such as input/output (I/O) interface circuitry to couple data in and out of the circuit 1, and clock distribution circuitry to provide clock signals to the processors of the tiles.

The integrated circuit 1 shown in FIG. 1A includes a two-dimensional array 2 of rectangular tiles with data paths 4 between neighboring tiles to form a mesh network. The data path 4 between any two tiles can include multiple conductor paths (or "wires") to support parallel channels in each direction. Optionally, specific sets of conductors between two tiles can be dedicated to different mesh networks that can operate independently.

Alternative network configurations include buses, rings, crossbars, hypercubes, trees, or networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 4 from one or more tiles at the edge of the network can be coupled out of the array of tiles 2 (e.g., over I/O pins) to an on-chip device 6A, an off-chip device 6B, or a communication channel interface 6C, for example. Multiple conductors of one or more parallel channels can be multiplexed down to a fewer number of pins or to a serial channel interface. For example, the conductors for one or more channels can be multiplexed onto a high-speed serial link (e.g., SerDes) or a memory controller interface (e.g., a memory controller for DDR or Dynamic RAM—also known as DRAM). The memory controller can be implemented off-chip or in logic blocks within a tile or on the periphery of the integrated circuit 1.

The following exemplary implementations are described in the context of tiles that have the same structure and functionality. Alternatively there can be multiple "tile types" each having different structure and/or functionality. For example, tiles that couple data off of the integrated circuit 1 can include additional circuitry for I/O functions.

Figure 1B:
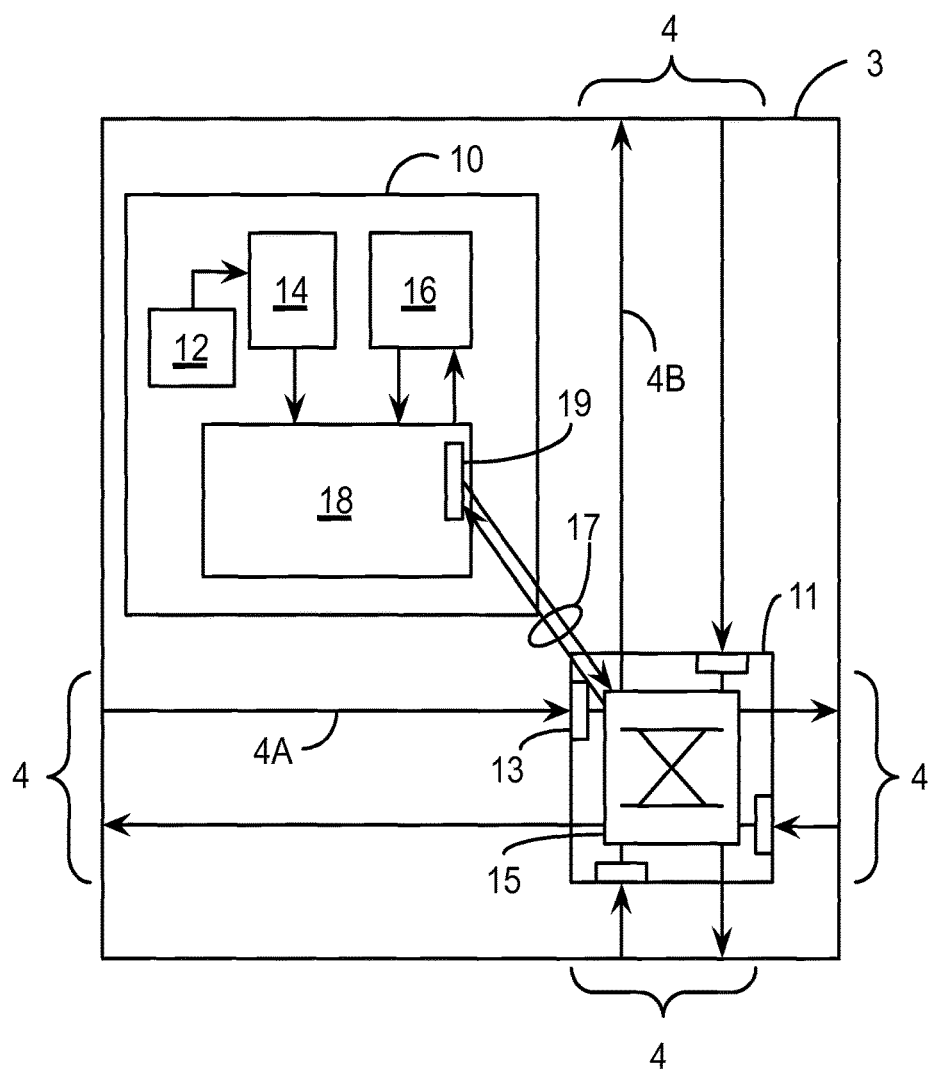
FIG. 1B is a block diagram of a tile.

Referring to FIG. 1B, a tile 3 includes a processor 10, a switch 11, and sets of incoming conductors 4A and outgoing conductors 4B that form the data paths 4 for communicating with neighboring tiles. The processor 10 includes a program counter 12, an instruction memory 14, a data memory 16, and a pipeline 18. The processor 10 can use any of a variety of pipelined architectures. The pipeline 18 includes pipeline registers, functional units such as one or more arithmetic logic units (ALUs), and temporary storage such as a register file. The stages in the pipeline 18 include, for example, instruction fetch and decode stages, a register fetch stage, instruction execution stages, and a write-back stage.

Either or both of the instruction memory 14 and data memory 16 can be configured to operate as a cache for off-chip memory. The cache hierarchy can take many forms, and the description here is just one example. For example, the instruction memory 14 includes an instruction cache that caches instructions, which can be a level 1 instruction cache (L1I), and the data memory 16 includes a data cache that caches data, which can be a level 1 data cache (L1D). Both the L1I cache and the L1D cache can be backed up by a level 2 unified cache (L2U) that is usually larger in size than either of the L1 caches. The caches are controlled by a cache controller.

On a cache miss from the L1I or L1D caches, the L2U cache is checked. If the data is found in the L2U cache, then a cache miss can be averted. If the instruction or data is not found in the L2U, then the instruction or data is fetched from outside the tile. Typically, the processor checks the cache in another tile called the home tile for that particular address that missed. This way, the L2U caches in the other tiles serve as a large distributed L3 cache. If the home tile has an entry for the data item (within a home location of a home cache in the home tile), the home tile can supply the data item to the requesting tile. If even the home tile causes a cache miss, then, as an example, the home tile handles the cache miss by sending the cache request to external memory (to DRAM typically) and obtains the data item from the external memory. The cache miss from the requesting tile gets turned into a message that traverses the network to get to the home tile. Similarly, the miss from the home tile to DRAM traverses the network.

Sometimes, instead of checking a home tile on a cache miss to the cache within a tile, the request is sent directly outside the chip to external DRAM memory.

The tile 3 can also include a cache controller that performs actions to ensure that cache coherence is maintained in the whole chip. Typically, the cache coherence information for a given cache line is maintained at the home tile for that cache line. The coherence information is stored in a directory to store the current state of the cache line. The home location for a given cache line is stored in a translation lookaside buffer (TLB) along with the page information for that cache line. The home location, within a home tile, for a given cache line can also be determined by hashing the cache line address to yield a home location. The home location can also be modified as the program executes. Data that has a home location in a home cache of a particular home tile is said to be "homed in" that particular tile.

The processor 10 can be multithreaded and/or have capabilities of a Very Long Instruction Word (VLIW) processor, a superscalar processor, or a vector processor.

Together the switches 11 in a multicore chip provide the communications infrastructure for all the cores. Switches can be built in many ways. As one example, the switch 11 includes input buffers 13 for temporarily storing data arriving over incoming conductors 4A, and switching circuitry 15 (e.g., a crossbar fabric) for forwarding data to outgoing conductors 4B or the processor 10. The input buffering provides pipelined data channels in which data traverses a data path 4 from one tile to a neighboring tile in predetermined number of clock cycles (e.g., a single clock cycle). This pipelined data transport enables the integrated circuit 1 to be scaled to a large number of tiles without the need to limit the clock rate to account for effects due to conductor lengths such as propagation delay or capacitance. (Alternatively, the buffering could be at the output of the switching circuitry 15 instead of, or in addition to, the input.)

A tile 3 controls operation of the switch 11 using either the processor 10, or separate switch processor dedicated to controlling the switching circuitry 15. Separating the control of the processor 10 and the switch 11 allows the processor 10 to take arbitrary data dependent branches without disturbing the routing of independent messages passing through the switch 11.

In some implementations, the switch 11 includes a switch processor that receives a stream of switch instructions for determining which input and output ports of the switching circuitry to connect in any given cycle. For example, the switch instruction includes a segment or "sub-instruction" for each output port indicating to which input port it should be connected. In some implementations, the processor 10 receives a stream of compound instructions with a first instruction for execution in the pipeline 18 and a second instruction for controlling the switching circuitry 15.

The switch instructions enable efficient communication among the tiles for communication patterns that are known at compile time. This type of routing is called "static routing." An example of data that would typically use static routing are operands of an instruction to be executed on a neighboring processor.

The switch also provides a form of routing called "dynamic routing" for communication patterns that are not necessarily known at compile time. Dynamic routing is also used for messages that result from cache misses or other cache coherence related transactions. In dynamic routing, circuitry in the switch 11 determines which input and output ports to connect based on header information in the data that is being dynamically routed during execution. A tile can send a message to any other tile by generating the appropriate address information in the message header. The tiles along the route between the source and destination tiles use a predetermined routing approach. For example, one routing approach is shortest Manhattan Routing (also known as dimension-ordered routing), which refers to routing along a first dimension followed by a second perpendicular dimension (where the distance between two points is measured by adding line segments that are arranged in a grid like pattern, with the line segments at right angles to each other, and not the straight line joining the two points). The number of hops along a route is deterministic but the latency depends on the congestion at each tile along the route. Examples of data traffic that would typically use dynamic routing are memory access traffic (e.g., to handle a cache miss) or interrupt messages.

The switch 11 includes dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

The switch 11 is coupled to the processor 10 over processor coupling wires 17. For fast (e.g., low latency) communication between tiles of neighboring processors, the coupling wires 17 are integrated directly into the pipeline 18. The processor 10 communicates with the switch 11 using distinct op-codes to distinguish between accesses to the static and dynamic network ports. Alternatively, the instructions can use register names to refer to switch ports. For example, the processor can send or receive data by writing to or reading from a register interface that is directly mapped to the input buffers 13 of the switch 11. For data going to or coming from the processor 10, a switch instruction indicates that the switch 11 should couple data to or from a selected register or bypass path of the pipeline 18 over a register mapped pipeline integrated switch interface 19. This pipeline integration allows data to be available to the switch 11 the moment an instruction is executed and the register value is available. In the next cycle the same data could appear at an input buffer of another tile.

To improve the latency of dynamic routing switches the tiles can use route prediction in the switches. With route prediction, a message that comes into an input port of the switch is routed to a given destination port of the switch based on a predicted port number. The prediction for a packet coming in from a given input port can be selected based on the route taken by the previous packet from that input port. If the hardware in the tile (e.g., prediction circuitry) determines that the prediction was incorrect, the hardware can take a few extra cycles to make the right routing decision based on the information in the packet header.

Other optimizations include using wide network channels. A tile can send single word messages containing both the packet header and the data value. The packet header includes information such as route information.

A tile 3 can include various types of memory modules to serve as the instruction memory 14, data memory 16, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 3 or the integrated circuit 1. Such external memory (e.g., DRAM) is accessible over high bandwidth paths of one or more dynamic networks. The amount of memory can be chosen to roughly balance the areas devoted to processing and memory, and to match the memory access time and the processor clock.

Functions such as virtual address translation, caching, global shared memory and memory protection can be implemented by any combination of hardware and software (e.g., processor instructions). A tile 3 can include a translation lookaside buffer (TLB) to translate virtual addresses as they come out of the processor 10 on each tile 3. Separate TLBs for instruction and data can also be used. A mode bit for each can turn off translation. Events such as cache miss or translation fault can trigger a trap or interrupt to the processor 10, so that the processor 10 can handle the event in software (using instructions executed by the processor).

The software running on the processor 10 can also use various mechanisms to speedup TLB miss handling. For example, a software TLB miss handler can also maintain a software cache of TLB entries. This software cache used by the software TLB miss handler is also called a TSB.

For example, there can be multiple trap lines (conductors carrying trap signals) to the processor 10. Alternatively, there are few trap lines, but there is a trap vector that the processor 10 can access which encodes the type of trap that occurred. There is a mode indicator, which can allow selecting whether the software or the hardware handles these events. A hardware cache tag file can export a hit/miss status to the software rather than stalling the processor pipeline.

An array of tiles 2 can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

The configuration of the circuitry in a tile 3 can be controlled by local control information stored in the tile. For example, a module in the tile can be turned on or off (to save power for example) or configured into a variety of modes (e.g., to set protection levels) based on the state of a "mode indicator" (e.g., one or more bits) stored in a register or other memory store.

Various parts of the multicore chip, for example, a tile, a processor in a tile, a processor and caches in a tile, can also be selectively shut off to save power. When doing so, the system takes care to selectively shut off or activate certain parts of the tile that are needed for other parts of the system to operate. For example, if a tile's cache is the home cache for a given set of cache lines, then that tile's cache controller and cache might be powered up. Alternatively, they might take a set of actions before they are powered down. These actions can transfer responsibility of processing to other parts of the chip.

As line rates of traffic increasingly rise, it is often not possible to timely execute all of the required applications completely in software. For such cases, a processor 10 can include accelerator circuitry to speedup processing for special functions such as security, compression, network packet processing, etc. The accelerator circuits (accelerators) can be connected directly to a tile or a core, or they can be connected to the periphery of an interconnection network (for example, like an I/O device). The accelerators can also be full participants in coherence protocols and can contain caches. They can also use cache coherence transfers to transfer data between them and the other cores, or they can use DMA (direct memory access) to transfer data from the caches on the rest of the chip to the accelerator memory or caches.

In this situation, it is useful to support a unified interface to the accelerators, such as in a MiCA interface (multicore interface for coprocessor acceleration). MiCA like interfaces can support direct transfer of data from the chip's caches to the accelerators. The accelerators can also be virtualized so that more cores can access the accelerators than there are accelerators.

Accelerators often have a queue of requests from processors (or cores or tiles). They can perform the operations requested in the requests in the order in which the requests were received (for example).

A software system for the tiled integrated circuit 1 includes a compiler that is able to schedule instructions for the processors in each of the cores. The compiler can also prepare communication over the static network, or messages to be sent over the dynamic network.

An exemplary operating system (OS) for the integrated circuit 1 can include a Linux-like kernel or a similar kernel running on a single tile 3. The OS can be a symmetric multiprocessing OS such as SMP Linux which can run on one or more tiles. Threads of SMP Linux running on multiple tiles communicate with each other through coherence shared memory. Alternatively, the OS can be a distributed OS running on multiple tiles sending messages to each of the processes on each of the tiles.

Another software system component that can be included is a hypervisor layer that provides physical device drivers for each physical device. The hypervisor also sets protection levels in the hardware. The hypervisor is responsible to multiplex various operating systems on the physical hardware and physical devices.

Application writers can program each of the cores or tiles in the multicore chip using languages such as C. Similarly, they can program multiple tiles by writing parallel programs using libraries such as pthreads, Message Passing Interface (MPI), or parallel languages such as OpenMP.

The software system can also include libraries that provide additional function such as interfaces that allow the user to access various hardware features directly, such as the registers related to the network, special purpose registers, synchronization operations, user-level message passing, etc.

2. Dynamic Code Generation for Trap Handling

Some techniques relate generally to providing support for exceptional events during program execution by generating code on the fly rather than by running conventional exception handling code.

Some instructions executed during normal program executing are "trapping"; that is, they cause an interrupt to be generated by the processor and the trap needs to be resolved before program execution can continue. In some cases the trap can be resolved and the instruction executed a second time to work correctly, as is true for page faults, some types of access violations, and other types of TLB (translation lookaside buffer) traps. In such cases there is typically no way for user space (a portion of memory segregated by the operating system for running user programs, e.g., as opposed to kernel space segregated for running the kernel) to avoid the cost of the trap. In other cases, such as an illegal instruction trap or a divide-by-zero trap, the program is performing an illegal operation and it may be challenging to "optimize" trap handling. Some implementations of a trap handler provide dynamic code generation for management of traps that can be avoided by having a different (typically slower) sequence of instructions be executed by the processor.

Typically a compiler will generate code that assumes the best case, i.e., that no trap will occur. If this assumption is incorrect, the operating system is expected to perform whatever "fix-up" is required to preserve the semantics of the code as generated by the compiler. For example, an unaligned access trap can occur on some machines when the compiler generates an instruction to load a four-byte value from memory, but the address specified is not evenly divisible by four. In this case the operating system may choose to respond to the resulting "unaligned access" trap by loading the appropriate value from memory, updating the application's register state as if the value had been loaded, and then continuing the application from the next instruction.

Such approaches to handling exceptional events are relatively slow, and in particular may not benefit from previous exposure to the same events. For example, each time an unaligned read occurs the same slow process may be performed again.

Dynamic code generation techniques, which include one or more of the following approaches, can be used in handling such exceptional events. For example, one approach would involve translating trapping machine instructions to sequences that do not cause traps. Another approach involves managing an efficient data structure that maps machine instructions to translations. In addition, other approaches involve safely coordinating shared data and machine-generated code without locks, efficiently and securely using user-space memory to store state in kernel code and updating the program image directly for frequently-trapping operations. Other approaches involve supporting pre-generated translations in the compiled code for efficiency; and generating compiler feedback to select trapping or non-trapping implementations.

The following approach may be used to execute an alternate sequence of instructions very efficiently when the original sequence is not performing well (for example, trapping or taking interrupts) for any reason. This example is described in the context of an interrupt handler for unaligned memory, but the approach is general and applies to other situations as well. When a trap due to an unforeseen event takes place, the interrupt handler for unaligned memory performs following actions to handle the trap. On entry, the handler stores some register state securely and efficiently, using user-space memory. The program counter (PC) and faulting instruction are looked up in a hash table to discover a translated sequence of instructions that can be run to perform the required load or store but without generating a trap. The interrupt handler restores the register state, and modifies the PC for the application to return to the translated code directly. The translated code executes (at the same protection level as the original code), performing the required load or store without generating a trap, then jumps back to the appropriate next instruction that the program would have run.

3. Caching Protocol Overview

The coherence protocol uses an Ownership directory (OD) to resolve coherence protocol races and enforce ordering, as well as to track only those cache blocks are that are owned. The protocol described herein is a hybrid protocol.

The protocol described below is a mechanism for maintaining cache coherence across multiple chips and/or sockets. The protocol describes the mechanism for finding the up-to-date copy of a cache block (or cache line, or cacheline) when a tile or processor accesses a given cache block. Within a chip, a typical cache access that misses in a level 1 cache and a level 2 cache on the tile, will ultimately access a Level 3 cache on a chip. This level 3 cache can be a distributed level 3 cache. The protocol is activated when the access misses in the level 3 cache. There are multiple ways in which cache coherence can be maintained across multiple chips, and this is one example protocol. The protocol described is an invalidate-based protocol, but other protocols such as update protocols can also be used.

Figure 2:
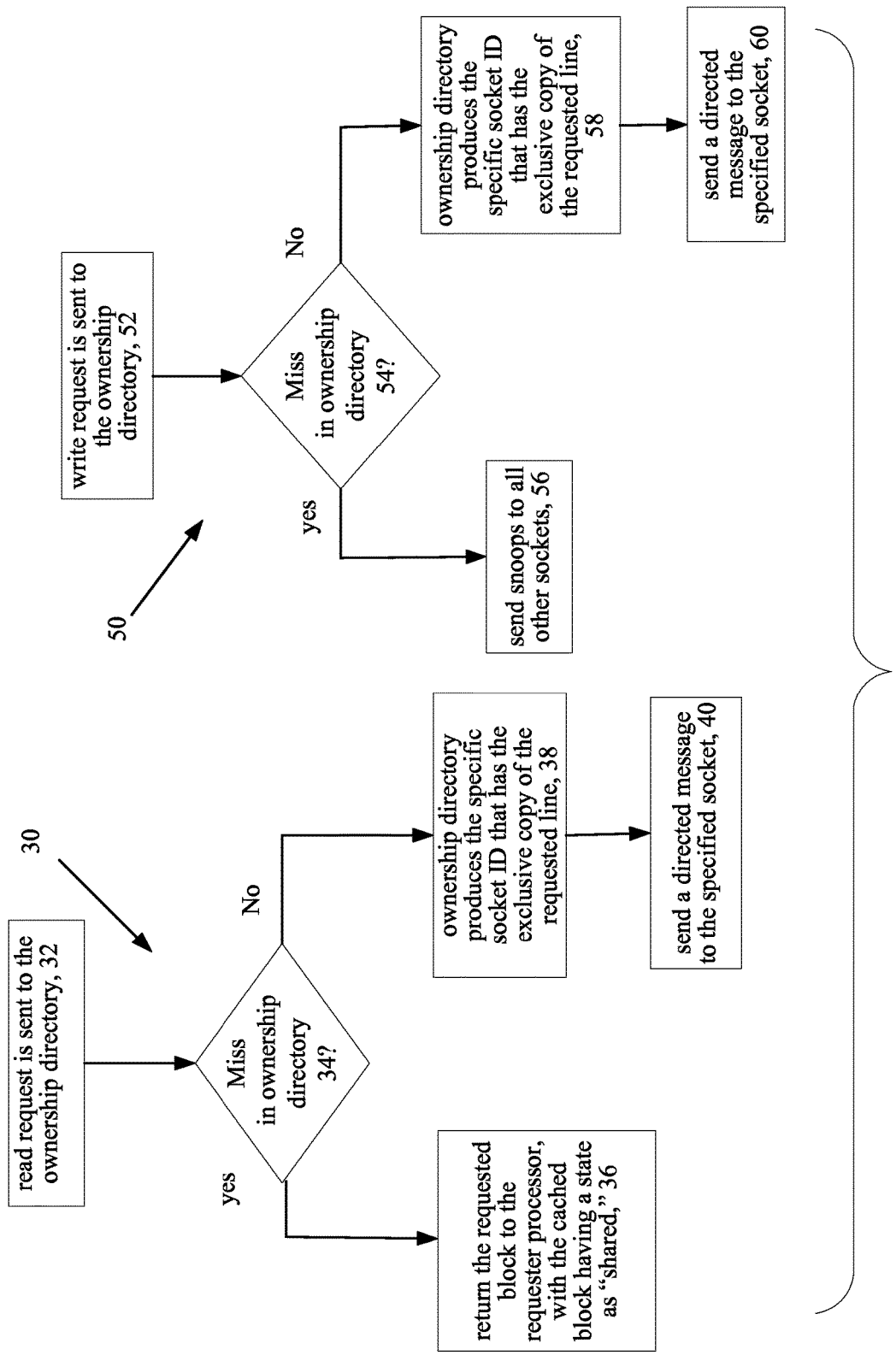
FIG. 2 is a flow chart depicting a cache protocol.

Referring to FIG. 2, a read request is sent 32 to the ownership directory. The request is tested 34, and if the read request misses in the ownership directory this means that no socket has an "exclusive" (or writeable) copy of the cache block. No snooping is required, since no requester owns the cache block. The ownership directory returns 36 the requested block to the requester processor, with the cached block marked having a state of "shared." If the read request does not miss in the ownership directory at test 34, the ownership directory produces 38 the specific socket ID that has the exclusive copy of the requested line and sends 40 a directed message to the specified socket.

When a write request is sent to the ownership directory 52, that write request is tested 54, and if there is a miss in the ownership directory, the requester does not know which other sockets may have copies of the block, so snoops are sent 56 to all other sockets. If the write request when tested 54 does not miss (i.e., there is a cache hit), the ownership directory produces 68 the specific socket ID that has the exclusive copy of the requested line and sends 60 a directed message to the specified socket.

When a read or write request hits in the ownership directory, the ownership directory produces the specific socket ID that has the exclusive copy of the requested line. The protocol sends a directed message to the specified socket. The protocol uses a snooping protocol for write requests that miss the directory, and uses directed messages for requests that hit in the ownership directory. The protocol does not track shared blocks. By not tracking shared blocks and by using the snoops for write requests that miss in the ownership directory, the protocol is able to greatly reduce the size of the ownership directory, especially, given the large cache sizes on today's multicore processors. Building an ownership directory that tracks all possible cached blocks would result in an extremely large structure. Because the ownership directory tracks only owned blocks and because it is located at the memory controller, whenever an owned block is "victimized" from the owning socket, the block is sent back to the memory controller. At this point, the tracking entry for the block is removed from the ownership directory, and this again minimizes the storage requirements.

The protocol mechanism described maintains cache coherence across multiple sockets. The protocol mechanism finds the up-to-date copy of a cache block on an L3 miss. The protocol is an invalidate-based type protocol. Each "cache line" has a unique global home socket. The global home socket is where the actual DRAM for the line lives. On an L3 miss for a cache line, the missing L3 memory bank sends a request to the home socket (either local or remote) for that cache line. The home socket receives the request, determines if the ownership directory has the line, and conditionally sends snoops to the other sockets in the system as well as a request to local DRAM for the requested line. Based on the contents of the ownership directory and the snoop responses from the peers, the home socket responds to the original requesting socket.

Gbox (Global Cache Coherence Controller)

Figure 3:
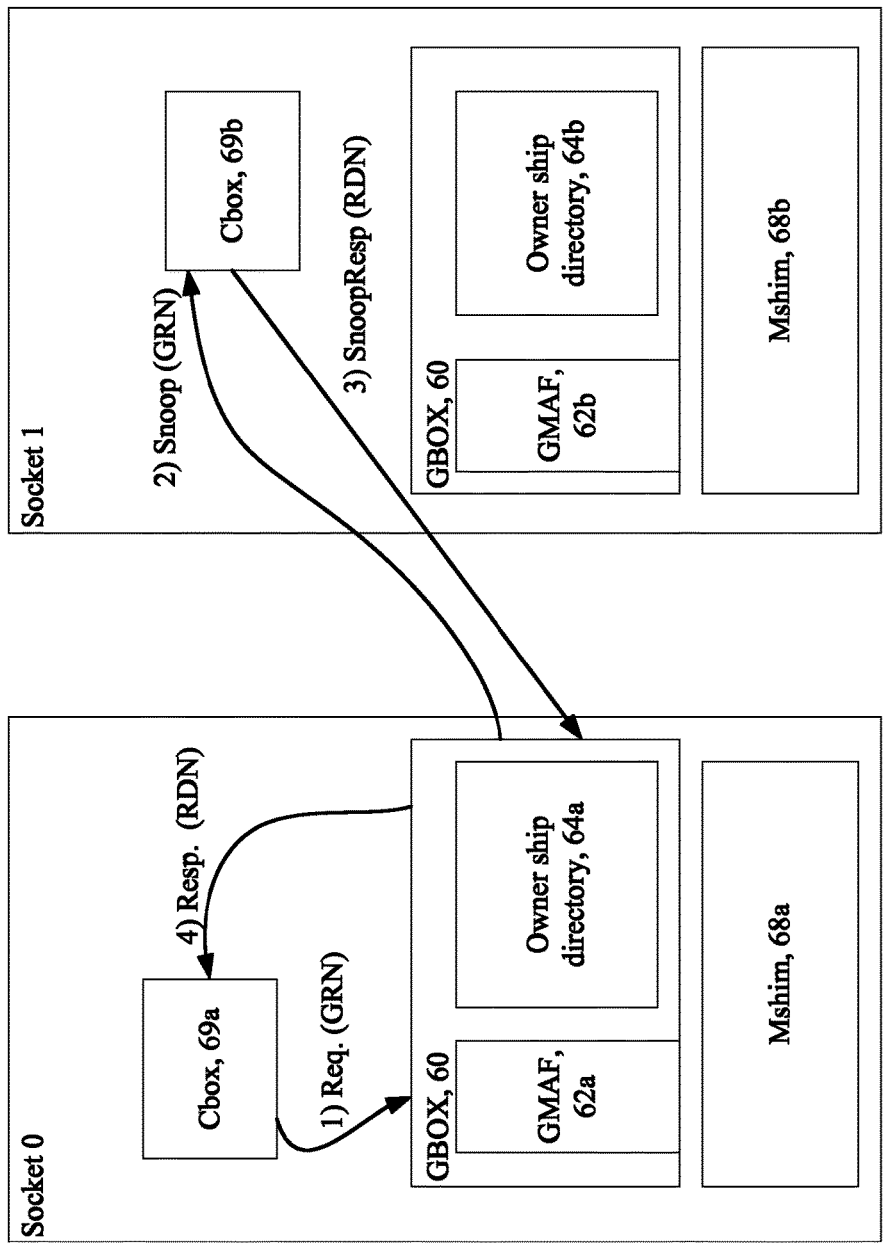
FIG. 3 is a diagram depicting memory shims.

Referring now to FIG. 3, two sockets Socket 0 and Socket 1 are shown. Each of the sockets Socket 0 and Socket 1 are shown including a global cache coherence controller 60a, 60b (Gbox) that provides an ordering point for global cache coherence operations. The Gboxes 60a, 60b for instance each access a global miss address file "GMAF" 62a, 62b, respectively that is provided for ordering and serializing access to cache blocks. The Gboxes 60a, 60b also each include an ownership directory 64a, 64b.

The Gbox is part of the memory controller, and there is one Gbox per memory controller, responsible for the physical address space that maps to that memory controller. The sockets Socket 0 and Socket 1 are occupied by two memory shims 68a 68b (e.g., memory cards, etc.). In each socket is a Gbox with a GMAF and an ownership directory, as shown. FIG. 3 shows example flows (denoted by arrows) as discussed further below.

Miss requests to the memory controller and victims to memory controller need not be on the same channel. The Gbox maintains an ownership directory to keep track of which blocks are owned by which sockets. The ownership directory does not have the capacity to track all owned blocks in the system, so it is possible that an ownership request arrives and there's no directory space for it. In that case, a flow is used to force the eviction of one of the owned blocks, freeing up a directory entry for the new request. Read only copies of blocks are not tracked, so invalidate messages are sent to all peer sockets on ownership requests that miss in the ownership directory. In the configuration, the invalidate latency is overlapped with the DDR read for the requested cache block, any added latency is tolerable here, because the latency will likely only occur on write misses (or SharedToDirty upgrades). Normal loads get shared copy and would thus require shared-to-dirty upgrades on subsequent stores. Optionally a snoop filter can be used to reduce need to invalidate all peer sockets on a store that misses in the ownership directory.

Virtual Channels:

Two virtual channels are used. One channel carries last-level cache e.g., level 3 cache, (LLC) load and store miss requests to the home Gbox. This channel is called the Global Request Channel/Network. This channel can be blocked due to the GMAF being full. The other channel carries global snoops to the peer socket Cbox 69a, 69b (L2 cache controller). This channel is called the Global Snoop Channel/Network (GSN). The GSN global snoop network is able to make progress in the presence of blocked SDN and blocked GRN. GSN messages generate traffic on the QDN request dynamic network and the RDN. Additionally, the QDN channel that is used for requests and victims to main memory changes.

Common requests and victims to main memory are on the same channel (QDN) because requests and victims are sunk (ended) at the memory controller with no forward dependency. The advantage of this is that the network keeps a request (X) ordered behind victim (X). With a global coherence protocol, request (X) might need to be blocked because another node has block X, and it is needed from the owning node. This situation can cause the channel to block, in turn blocking victims a producing a deadlock. However, if victims and requests are placed on different channels this avoids the deadlock. However, now there is an ordering problem to keep request (X) from passing victim (X).

In the described protocol, that type of ordering is not enforced. Instead, the protocol allows request (X) and victim (X) to get out of order. The protocol relies on the state in the ownership directory to tell the memory controller how to put them back in order. This approach allows the ownership directory to resolve races and to provide the identity of the socket that owns a given cache block.

Since ordering of requests to memory and victims to memory are no longer required, the scheme introduces new races. Victim/Request Race: Request(X) arrives at home from node N but OD indicates that node N is owner. The Action taken is to Block and wait for victim. Victim/Snoop Response Race: Snoop(X) arrives at peer node N, but peer node N has already victimized the block. SnoopMiss(X) arrives at home before victim(X). the Action taken is to Block and wait for victim.

The full VC hierarchy becomes:
    SDN (request from local core)→
    GRN (request to home)→
    GSN (snoop to peer)→
    QDN (local invalidates)→
    RDN (responses)

Cache line, pad-to-cache line writes from IO and WH64
    These transactions invoke an Invalid2Dirty flow at the home Cbox.
        Home Cbox buffers data, sends Inval2DirtyReqtoHome, writes data into cache on I2DAck from home Chip to Chip interconnect: SERDES (Serializer/Deserializer) lanes provide the point-to-point interconnection between sockets for carrying global coherence messages. Link level protocol is reliable, guaranteed delivery, with credit/debit flow control.

Message Classes

Req2Home—Sent from Cbox on a Cbox miss, to either local Gbox or remote Gbox. Can back up, due to blocking at GMAF. Occupies a CMAF at requesting Cbox, allocates a GMAF at home Gbox. Carried on the GRN, generates traffic on the GSN and RDN.
    Read2Home—load miss at LLC. Give me a shared copy of the line.
    ReadExc2Home—store miss at LLC. Give me an exclusive copy of the line.
    Shared2Dirty—store hit shared copy at LLC. Give me exclusivity on the line.
    Inval2Dirty—WH64 or IO writeline/pad line at LLC. Give me exclusivity on the line, but not the background data.

Vic2Home—Sent from Cbox on displacement of an owned dirty block, to either local Gbox or remote Gbox. Not ordered, is not back up, always sunk by home Gbox. Carried on the RDN.

GlobalSnoop—Sent from home's Gbox to the home Cbox in response to receiving a Req2Home and consulting the exclusive directory. The home Cbox could be either on this socket or on other socket. Pass a Req2Home queued at home CMAF. Carried on the GSN.

GlobalSnoopRsp—Sent from home Cbox in response to GlobalSnoop. Response message, always sunk. Carried on the RDN.

Ownership Directory

The ownership directory is sufficiently large and highly associative such that the common case is that there's a free "slot" to record the ownership of a cache line. When there's not a free slot, the controller provides one by revoking ownership of another block. Victims produce free slots. When the controller produces victim, no entity owns the block any longer, so that the block is no longer tracked in the directory. The Ownership directory entries simply record which socket owns the block, e.g., 2 bits per entry. All the storage is in the "tags". Roughly speaking a tag is around 4B (bytes). A "perfect" directory (e.g. a duplicate tag store), storage requirements would be 1 entry/tag for each LLC line times the number of sockets, so e.g. for a 4 socket Gx36 system with an 8 MB L3, there would be 8 MB/64B=128K lines. So with a 4B tag this is 512 KB of storage times 4, so 2 MB of storage. If we double the LLC, this is 4 MB of storage required for the OD. In practice get away with much less, because blocks get victimized, etc. If we reduce by a factor of 8, this is 512 KB which seems like a reasonable storage requirement.

Eviction Flow Ownership request for X arrives at Gbox, look up the N tags at that set, and they are all "in use". Select one of the N tags (say Y) for eviction (e.g., pseudo Least Recently Used) and send a ReadExcSnoop(Y) to the owner. Owner will respond with a BlkVictim(Y) on the RDN just like in the normal flow. This frees his tag for use by block X. In FIG. 3 the two sockets are shown occupied by two memory shims (e.g., memory cards, etc.)

Some example flows are:

Upon an L3 read miss (X), global home is local or remote (same handling)
    ReadToHome(X) on Global Request Network (GRN)
    CAM/Allocate GMAF(X), block request if transaction inflight to X
    Check OD for ownership of X
        If owned, Send ReadSnoop(X) on Global Snoop Network (GSN) to owning node
        If not owned, send request to mem controller
        Fill response to requester on RDN L3 write miss(X), global home is local or remote
    ReadExcToHome(X) on GRN
    CAM/Allocate GMAF(X), block request if transaction inflight to X
    Check OD for ownership of X
        If owned, send ReadExc(X) on GSN to owning node
        If not owned, send Inv(X) on GSN to peer nodes, and request to mem controller
        Fill response to requester on RDN Incoming ReadSnoop(X) at owning node If hit, downgrade LLC copy to shared, send BlkRsp to home on RDN
If miss, send SnoopMiss to home on RDN
Incoming ReadExcSnoop(X) at owning node
If hit, LLC copy to Invalid, Invalidate local copies, send BlkRsp to home on RDN
If miss, send SnoopMiss to home on RDN
S2D(X) race: Socket 0 and socket 1 have block X shared, and both do writes to block X
Both send S2D(X) to home
One gets there first, say socket 0
Home sends inval(X) to socket 1, and waits for ack
On ack, home sends S2DAck(X) to socket 0
At socket 1, CMAF[X] with pending store has been hit with global invalidate. Block has been invalidated from socket, CMAF[X] is marked at InvalHit, store data is still buffered (but invisible). Socket 1 sends invalidate acknowledgement back to home, CMAF[X] still active.
At home, S2D from socket 1 eventually arrives. If socket 0 is still the owner, home sends ReadExclusive(X) to socket 0. HOWEVER, socket 0 might have victimized the block in the meantime, and home no longer has socket 0 in the directory.
In this case, home will send S2DAck(X) to socket 1. Since socket 1 has the CMAF[X].InvalHit, it knows what happened. Cbox resends ReadExclusive(X).

Typically the socket home is determined similar to how the Cbox home is determined; that is, can either home an entire page at a socket or use bits above cachline address to interleave cachlines across sockets. Memory pages can be marked as non-shared. Memory Mapped I/O (MMIO) handling can have an MMIO page homed locally or remotely, just like a normal page. Rather than sending IO read/write to the device on this socket (i.e., mpipe), the IO read/write is sent to the home socket. One such example of a network interface engine is a multicore Programmable Intelligent Packet Engine (mPipe™ Tilera Corporation).

A number of embodiments of the invention have been described. Nevertheless, it will be understood that various modifications may be made without departing from the spirit and scope of the invention. Accordingly, other embodiments are within the scope of the following claims.

What is claimed is:

1. A method of maintaining cache coherency in a system comprising plural multi-core processor chips in plural sockets, the method comprising:
   receiving at a memory controller a read request for a block of data, with the request received from a requesting processor in one of the plural sockets;
   accessing an ownership directory that keeps track of which blocks are owned by the plural sockets to determine if the read request misses in the ownership directory, with the ownership directory tracking only cache blocks of data that are owned by one or more of the plural sockets;
   when the read request misses in the ownership directory, activating a hybrid cache coherency protocol by:
   marking the block of data with a shared status;
   returning the block of data corresponding to the read request, with the shared status to the one of the plural sockets that has the requesting processor, without sending a snoop message to other sockets.

2. The method of claim 1 wherein the hybrid cache coherency does not track shared blocks.

3. The method of claim 1 wherein the ownership directory is in the memory controller, and when the status of the block of data is changed to shared, the method further comprises: sending the block of data back to the memory controller.

4. The method of claim 1 wherein the ownership directory is located at the memory controller, and when the read request is for the block of data that missed in a cache that is a distributed cache and is at a cache level closest to memory.

5. The method of claim 1 wherein the protocol maintains cache coherence across multiple sockets and each block has a unique global home socket, where the global home socket is a memory bank location for the block of data.

6. A method of maintaining cache coherency in a system comprising plural multi-core processor chips in plural sockets, the method comprising:
   receiving a write request from a requesting one of the plural sockets for a requested line at a memory controller;
   accessing an ownership directory that keeps track of which blocks are owned by the plural sockets to determine if the write request misses in the ownership directory, with the ownership directory not tracking shared blocks of data and only tracking cache blocks of data that are owned by one or more of the plural sockets;
   when the write request misses in the ownership directory, sending snoops out to other sockets;
   responding by a home socket that has the requested line for the write request to the requesting socket.

7. The method of claim 6 wherein each block of data is associated with a unique global socket home.

8. The method of claim 6 wherein the ownership directory is associative, with entries to record ownership of a cache block, when there is not a free entry, the memory controller provides an entry by revoking ownership of another block in the ownership directory.

9. The method of claim 6 wherein the ownership directory is located at the memory controller.

10. The method of claim 6 wherein when a socket of the plural sockets has an exclusive copy of the requested line, and an owned block is victimized from the socket that has the exclusive copy of the requested line, the requested line is sent back to the memory controller and removed from the ownership directory.

11. Apparatus comprising:
   a memory controller for maintaining cache coherency, the controller configured for a system comprising plural multi-core processor chips in plural sockets, the apparatus configured to:
   receive a read request from a requesting one of the plural sockets for a requested cache line;
   access an ownership directory that keeps track of which blocks are owned by the plural sockets to determine if the read request hits or misses in the ownership directory, with the ownership directory tracking only cache lines of data that are owned by one or more of the plural sockets;
   activate a hybrid cache coherency protocol either;
   when the read request misses in the ownership directory by configuring the apparatus to:
   mark the requested cache line with a shared status;
   return the requested cache line corresponding to the read request without sending a snoop message to other sockets
   or when the read request hits in the ownership directory by configuring the apparatus to:
   change status of the requested cache line to a shared status;

remove from the ownership directory, a directory entry corresponding to the requested cache line having the changed shared status;

produce a specific socket ID corresponding to the multi-core processor chip socket that has the exclusive copy of the requested cache line; and send a directed message to the specified socket to supply the requested cache line.

12. The apparatus of claim 11 configured to:

receive a write request at the memory controller;

access the ownership directory to determine if the write request hits or misses in the ownership directory;

when the write request misses in the ownership directory, send snoops out to other sockets; and respond by a home socket that has the requested line for the write request to the requesting socket;

or when the write hits in the ownership directory, produce the specific socket ID that has the exclusive copy of the requested cache line; and send a directed message to the specified socket to supply the requested cache line.

13. The apparatus of claim 11, further configured to:

send the requested cache line back to the memory controller.

14. The apparatus of claim 11 wherein the ownership directory is located at the memory controller.

15. The apparatus of claim 11 wherein the protocol maintains cache coherence across multiple sockets and each cache line has a unique global home socket, where the global home socket is a memory bank location for the requested cache line.

16. Apparatus comprising:

a memory controller for maintaining cache coherency, the controller configured for a system comprising plural multi-core processor cores chips in plural sockets, the apparatus configured to:

receive from a requesting socket, a write request for a requested line at the memory controller;

access an ownership directory that keeps track of which blocks are owned by the plural sockets to determine if the write request hits or misses in the ownership directory, with the ownership directory tracking only cache blocks of data that are owned by a socket of the plural sockets;

when the write request misses in the ownership directory, send snoops out to other sockets;

respond by a home socket that has the requested cache block of data for the write request to the requesting socket;

when the write hits in the ownership directory, produce a specific socket ID that has the exclusive copy of the requested line; and send a directed message to the specified socket.

17. The apparatus of claim 16 wherein the memory controller returns the requested cache block for read requests that miss the ownership directory and sends to specific sockets directed messages for read requests that hit in the ownership directory.

18. The apparatus of claim 16 wherein the ownership directory is associative, with entries to record ownership of a cache block, when there is not a free entry, the memory controller provides an entry by revoking ownership of another block in the ownership directory.

19. The apparatus of claim 16 wherein the ownership directory is located at the memory controller.

20. The apparatus of claim 16 wherein when an owned block is victimized from the socket that has the exclusive copy of the requested line, the requested line is sent back to the memory controller and removed from the ownership directory.

21. A method of maintaining cache coherency in a system comprising plural multi-core processor core chips in plural sockets, the method comprising:

receiving a read request at a memory controller, the request being for a block of data;

accessing an ownership directory that keeps track of which blocks are owned by the plural sockets to determine if the read request hits in the ownership directory, with the ownership directory tracking only cache blocks of data that are owned by a socket of the plural sockets;

when the read request hits in the ownership directory, activating a hybrid cache coherency protocol by:

changing status of the block of data to a shared status;

removing from the ownership directory, a directory entry corresponding to the requested block of data having the changed shared status;

producing a specific socket ID corresponding to the multi-core processor chip socket that has the exclusive copy of the requested block; and sending a directed message to the specified socket to supply the requested block.

22. A method of maintaining cache coherency in a system comprising plural multi-core processor chips in plural sockets, the method comprising:

receiving a write request from a requesting one of the plural sockets for a requested line at a memory controller;

accessing an ownership directory that keeps track of which blocks are owned by the plural sockets to determine if the write request hits in the ownership directory, with the ownership directory not tracking shared blocks of data and only tracking cache blocks of data that are owned by one or more of the plural sockets;

when the write hits in the ownership directory, producing a specific socket ID that has the exclusive copy of the requested line; and sending a directed message to the specified socket.

* * * * *